US006240672B1

(12) United States Patent
Huppert

(10) Patent No.: US 6,240,672 B1
(45) Date of Patent: Jun. 5, 2001

(54) FISHING LURE DRESSING KEEPER

(76) Inventor: Mikel Huppert, 1327 Debra St., Ellsworth, WI (US) 54011

( * ) Notice: Subject to any disclaimer, the term of this patent is extended or adjusted under 35 U.S.C. 154(b) by 0 days.

(21) Appl. No.: 09/336,577

(22) Filed: Jun. 21, 1999

(51) Int. Cl.[7] .......................... A01K 85/00; A01K 85/02; A01K 83/06
(52) U.S. Cl. ....................... 43/44.8; 43/42.37; 43/42.39; 43/42.4
(58) Field of Search ............... 43/42.09, 42.24, 43/42.37, 42.39, 42.4, 42.42, 44.2, 44.8; 411/510, 509, 508, 413; 138/110, 128, 172, 173, 177, 178

(56) References Cited

U.S. PATENT DOCUMENTS

| 1,152,698 | * | 9/1915 | Bonner | 43/44.8 |
|---|---|---|---|---|
| 2,273,582 | * | 2/1942 | Maire | 43/44.8 |
| 2,821,046 | * | 1/1958 | Fisk | 43/44.2 |
| 3,399,483 | * | 9/1968 | Naffziger | 43/44.8 |
| 3,409,224 | * | 11/1968 | Harp et al. | 239/177 |
| 3,427,744 | * | 2/1969 | Roberts | 43/42.39 |
| 3,550,306 | * | 12/1970 | Heitman | 43/42.37 |
| 3,611,614 | * | 10/1971 | Ward | 43/42.24 |
| 3,624,950 | * | 12/1971 | Merckes | 43/44.2 |
| 3,905,149 | * | 9/1975 | McCloud | 43/44.2 |
| 3,990,171 | * | 11/1976 | Davis | 43/42.4 |
| 4,219,956 | * | 9/1980 | Hedman | 43/42.39 |
| 4,367,607 | * | 1/1983 | Hedman | 43/42.24 |
| 4,777,758 | * | 10/1988 | Phillips | 43/42.09 |
| 4,827,657 | * | 5/1989 | Slehofer | 43/44.2 |
| 4,850,132 | * | 7/1989 | Motyka | 43/44.2 |
| 4,858,367 | * | 8/1989 | Rabideau | 43/42.25 |
| 4,967,799 | * | 11/1990 | Bradshaw et al. | 138/110 |
| 4,976,715 | * | 12/1990 | Bays et al. | 411/510 |
| 5,117,575 | * | 6/1992 | Desmond | 43/44.8 |
| 5,129,175 | * | 7/1992 | Pixton | 43/42.39 |
| 5,152,094 | * | 10/1992 | Strickland | 43/42.24 |
| 5,230,178 | * | 7/1993 | Dillard | 43/44.8 |
| 5,230,595 | * | 7/1993 | Fischer | 411/508 |
| 5,339,559 | * | 8/1994 | Strobbe | 43/42.37 |
| 5,388,367 | * | 2/1995 | Rydell | 43/42.42 |
| 5,490,345 | * | 2/1996 | Infinger | 43/42.39 |
| 5,491,927 | * | 2/1996 | Ortiz | 43/42.37 |
| 5,551,185 | * | 9/1996 | Reed | 43/42.39 |
| 5,630,289 | * | 5/1997 | Dotson | 43/42.09 |
| 5,649,384 | * | 7/1997 | Manning | 43/42.39 |
| 5,904,001 | * | 5/1999 | Rabideau | 43/44.8 |
| 5,958,529 | * | 9/1999 | Myong et al. | 138/128 |

FOREIGN PATENT DOCUMENTS

2278031 * 11/1994 (GB) .................................... 43/54.1

* cited by examiner

Primary Examiner—Darren W. Ark
(74) Attorney, Agent, or Firm—D. L. Tschida

(57) ABSTRACT

A molded plastic keeper having an elongated stem and from which a series of 3-dimensional projections radiate. The projections can exhibit different shapes and offsets from the stem. In various constructions, a keeper with conical ribs is molded to the shank of a bare or wire at a jig or lure to support live bait or an artificial dressing. In another construction, the keeper is molded over a wire core that can be formed and mounted to a hook eye or cast into the body of a lure. In another construction, a hollow bore extends through the keeper and permits a threaded fitting over a fish line. A longitudinal slot can be included at a hollow bore keeper and/or the keeper can be constructed of a material that shrinks. A buoyant, weighted and/or hollow headpiece having a longitudinal bore can cooperate with the keeper and may support a rattle.

15 Claims, 6 Drawing Sheets

FISHING LURE DRESSING KEEPER

BACKGROUND OF THE INVENTION

The present invention relates to fishing lures and, in particular, to a molded plastic keeper that can be attached to a lure or fishhook to support a variety of lure accessories and/or live bait at a number of surface projections and prevent premature withdrawal.

Numerous devices are available to fisherman to retain dressings, live bait and other accessories to a fishhook or lure. Some fishhooks include barbs or burrs that flare from the shank of the hook. The barbs are formed by peeling or shaving a portion of the shank to extend at a preferred angle. The barbs are formed to resist withdrawal of a dressing or live bait that is mounted over the barbs.

Pegs having a barbed shank and opposite ends that contain a point and an eyelet are available that mount to the eye of a hook or lure. The peg can be inserted into a portion of a dressing accessory, such as a molded plastisol member, which will then trail from the hook. Upon also attaching the barb of the hook to the dressing, the gap between the barb and hook eye can be sheltered to make the hook or lure weedless. Similar pegs are used to secure tippets to braided fly fishing lines.

Molded plastic keeper pegs also exist that have a barbless, elongated, spindle shaped shank, a point at one end and an eyelet at an opposite end, reference U.S. Pat. No. 5,904,001. Hooks that include the foregoing metal and plastic pegs are sold by Mister Twister under the brand names KEEPER HOOK and SMART HOOK.

U.S. Pat. No. 5,630,289 discloses a solid bodied plastic shaft that has a number of barbs that project transverse to the shaft. The barbed member is used to splice and/or to secure dressings to a lure.

U.S. Pat. No. 4,858,367 discloses a keeper peg that is molded into a jig head.

Jigs and lures have also been molded with body parts or appendages that include projecting barbs or a series of conical rings to support a dressing that is threaded over the appendage. Wires with spiral windings and other bend configurations have also been molded into or attached to various lures and hooks to retain desired dressings or live bait.

Wire and bristle weed guards also exist that are typically molded into the body of a lure. The guard typically is mounted to shelter the point of the hook from weeds, yet flex to expose the hook with the occurrence of a fish strike.

The keeper of the present invention was developed to provide a light weight accessory piece that can be adapted to many different lure and hook presentations as a live bait or dressing retainer and/or a weed guard. The retainer comprises an elongated stem that supports a series of conical protrusions that radiate from the stem. A hollow longitudinal bore and/or slot can extend the length of the stem. The keeper can also be molded over a formable wire substrate or the shank of a hook. The keeper can be constructed of a material that shrinks upon exposure to heat or another catalyst. The keeper can also be adapted to cooperate with a floating or weighted headpiece.

SUMMARY OF THE INVENTION

It is accordingly a primary object of the invention to provide a molded plastic keeper having a number of projections that radiate from an elongated body or stem.

It is a further object of the invention to provide a keeper having a number of conical projections that extend seriatim along the stem and exhibit differing diameters.

It is a further object of the invention to provide a keeper wherein a hollow bore or slot extends the length of the stem.

It is a further object of the invention to provide a keeper that includes a hollow headpiece that cooperates with the stem.

It is a further object of the invention to provide a keeper that is constructed of a material that shrinks upon exposure to heat or other catalyst and which can be permanently set after being mounted to a lure or hook.

It is a further object of the invention to provide a keeper that is molded over a stranded or solid wire core that can be formed to a preferred shape.

The foregoing and other objects, advantages and distinctions of the invention are obtained in a number of presently preferred keepers. Each keeper includes an elongated stem and relative to a longitudinal axis of which a series of conical or tapered projections radiate. The projections can exhibit the same and/or different diameters and shapes over the length of the stem. In one construction, the keeper is molded to the shank of a hook, jig or lure to support live bait or an artificial dressing that is separately threaded over the shank and keeper. In another construction, the keeper is molded over a wire core that can be formed and mounted to a hook eye or cast into the body of a lure. In another construction, a hollow longitudinal bore and/or slot extends through the keeper. A hook or fish line can be threaded through the bore or the keeper can be mounted by pressing the slot against the support fixture to flex the keeper and fit the fixture in the bore. A portion of one end of the keeper can cooperate with a floating or weighted headpiece that may include a rattle chamber. The keeper can also be molded from a material that shrinks upon exposure to heat or other catalyst. Once positioned onto a support, the keeper can be shrunk to contract about the support.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
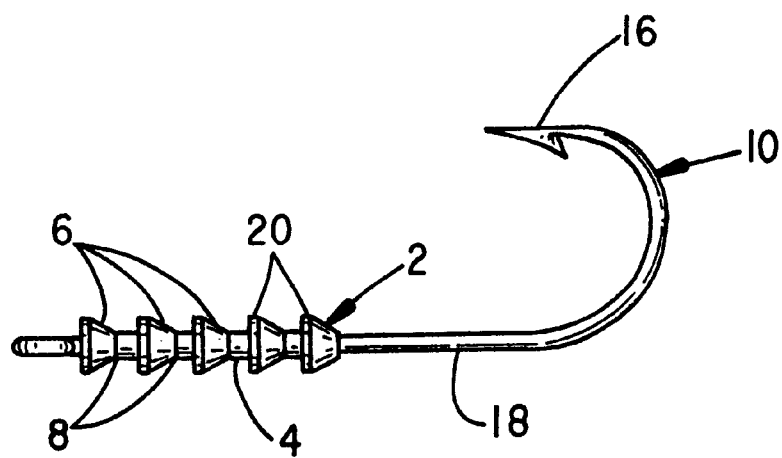
FIG. 1 is a plan drawing to a hook having a molded-in-place keeper.
Figure 2:
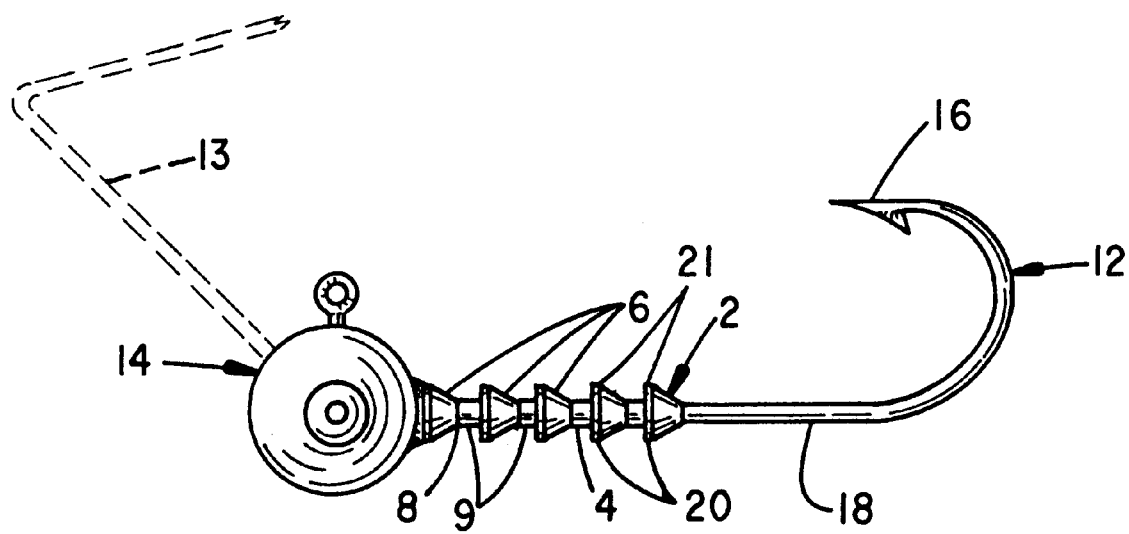
FIG. 2 is a plan view of a typical jig having a molded-in-place keeper.

Referring to FIGS. 1 and 2, a molded plastic keeper 2 is shown. In FIG. 1, the keeper 2 is fitted to a bare fishhook 10. In FIG. 2, the keeper is secured to the hook 12 of a jig type lure 14.

The keeper 2 includes an elongated body or stem 4 and from which a series of 3-dimensionally tapered, flanged ribs, protrusions or projections 6 radiate. The projections 6 are positioned such that an apex 8 of each extends toward the barb 16 of the associated hook 10 or 12. The projections 6 are separated by a gap or cylindrical spacer 9. A live bait or dressing is normally threaded over the barb 16, along the shank 18 of the hook 10 or 12, and onto the keeper 2. Relatively large diameter ends 20, opposite the apex 8 of each projection 6, retain the bait or dressing to the keeper 2. Cylindrical edges 21 adjacent each end surface 20 can be included to facilitate removal of certain dressings without tearing or shredding the dressing.

The keeper 2 can be molded from a variety of plastic or nylon materials, including materials that are susceptible to shrinkage when exposed to heat. The color of the material can be varied as desired to accentuate the presentation. The relatively light weight of such materials assures that the keeper 2 doesn't unbalance a constructed lure and facilitates use of the keeper with neutral buoyancy and floating lure assemblies.

The keeper 2 can be molded directly to the hook 10 or 12 in the fashion of FIGS. 1 and 2. The keeper 2 can also be molded onto a wire 13 (shown in dashed line) such as at a spinner bait. The keeper 2 can also be constructed with a longitudinal bore 22, reference FIGS. 4 and 7, and/or with a longitudinal slit 24, reference FIG. 6, to accommodate an after-market mounting. The diameter and taper of the projections 6 can be sized as desired. The shape of the projections 6 can also be varied and projections of many different shapes and sizes can be included alone or in combination at the keeper 2. The projections 6 presently exhibit a conical or frustum shape, although can exhibit a variety of other tapered shapes, such as a pyramidal or elliptical shape, when view end-on, reference FIG. 6. The spacing 20 between the projections 6 can also be varied. In all instances, however, the shape and positioning of the projections 6 are tailored 3-dimensionally to resist premature withdrawal of a bait or dressing once threaded onto the keeper 2.

Figure 3:
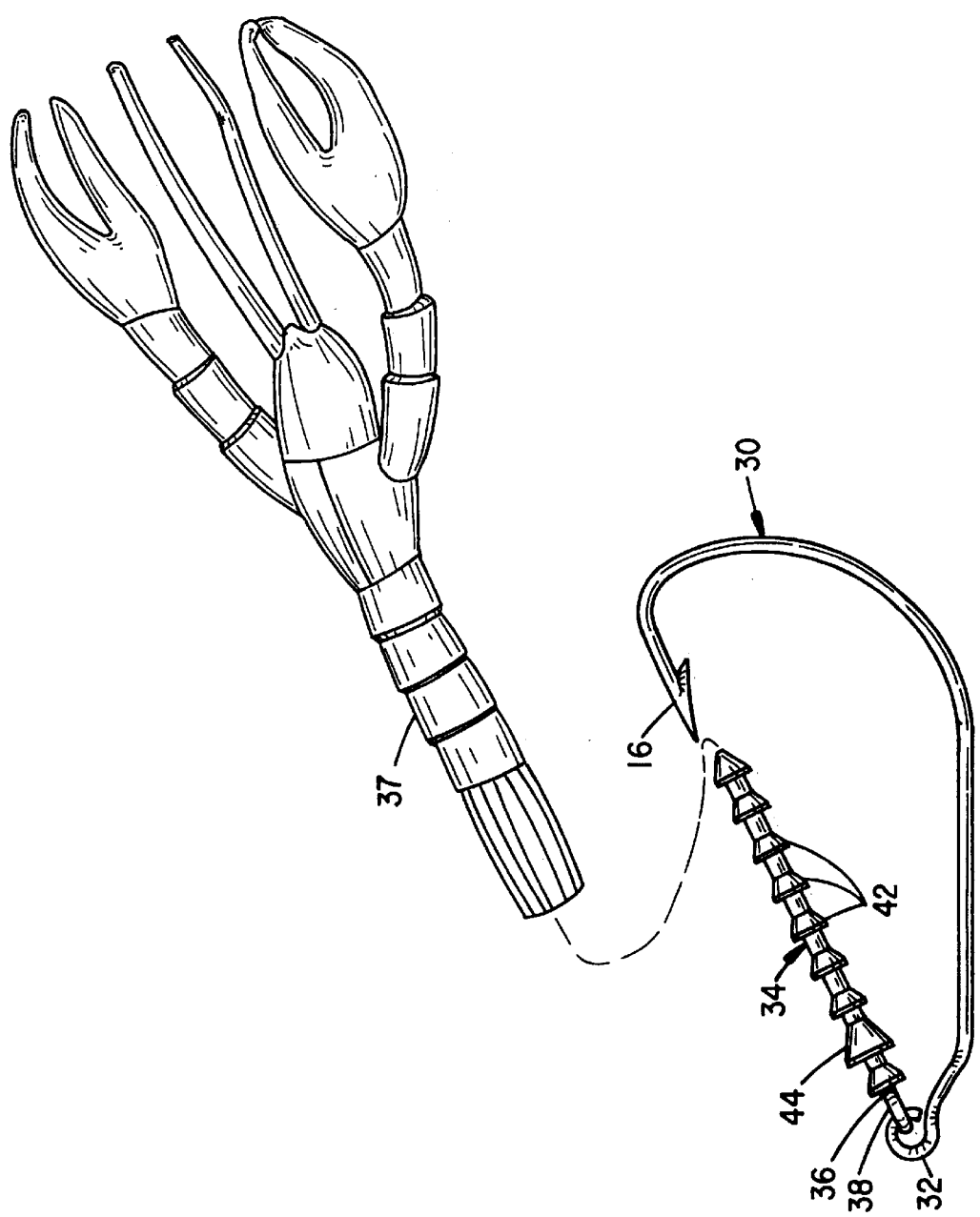
FIG. 3 is a plan view to a hook including a wire cored keeper mounted to act as a weed guard.

Referring to FIG. 3, a hook 30 is shown that has an eye 32 and to which a keeper 34 is mounted. One end of a wire core 36 of the keeper 34 is bent to provide an eye 38 that interlocks with the eye 32. The coupling of the eyes 32 and 38 allow the keeper 34 to pivot and move freely relative to the hook 30. A plastisol dressing 37 molded to a preferred shape (e.g. worm, eel, crayfish, salamander, lizard, cricket, minnow or other natural bait imitation) can be threaded onto the keeper 34 to secure the dressing 37 to the keeper 34. The barb 16 of the hook 30, if separately attached to the dressing 37, creates a weedless presentation.

Figure 4:
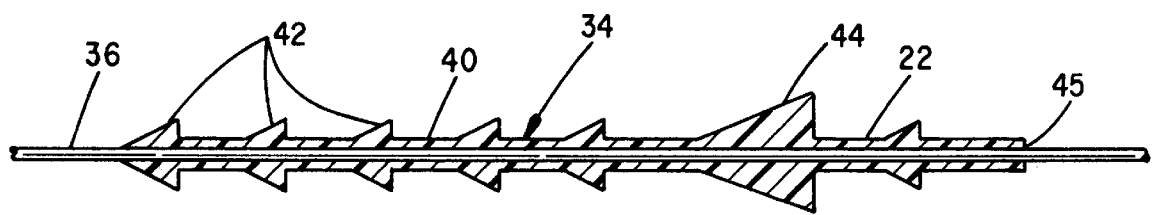
FIG. 4 is a longitudinal cross section view through the keeper of FIG. 3.

FIG. 4 shows a cross section view through the keeper 34. The stem 40 includes a series of conical protrusions 42 of the same size. A larger diameter protrusion 44 radiates from the end adjacent the eye 38. The protrusion 44 can act as a stop to prevent withdrawal of a banded skirt dressing that is threaded past the projection 44 and such as described below with respect to FIG. 5. The diameter of the protrusions 42 and 44 can be sized as desired, although presently are sized in respective ranges of 2 to 3 mm and 3.5 to 5.0 mm. The diameter of the bore 45 at the core piece 36 is selected in a range of 0.5 to 1.0 mm to accommodate several sizes of wire. The bore 45 can also be sized to accommodate a range of fish line that might mount through the bore 45.

The keeper 34 is molded onto the core 36, which can be a solid or multi-stranded wire. The keeper 34 can be cut to a preferred length and the exposed end of the core 36 can be bent to any desired shape, such as the eye 38. Alternatively, the exposed end of the core 36 can be positioned within a mold and cast into a jig or other molded lure, for example reference the jig type lure 50 of FIG. 5.

Figure 5:
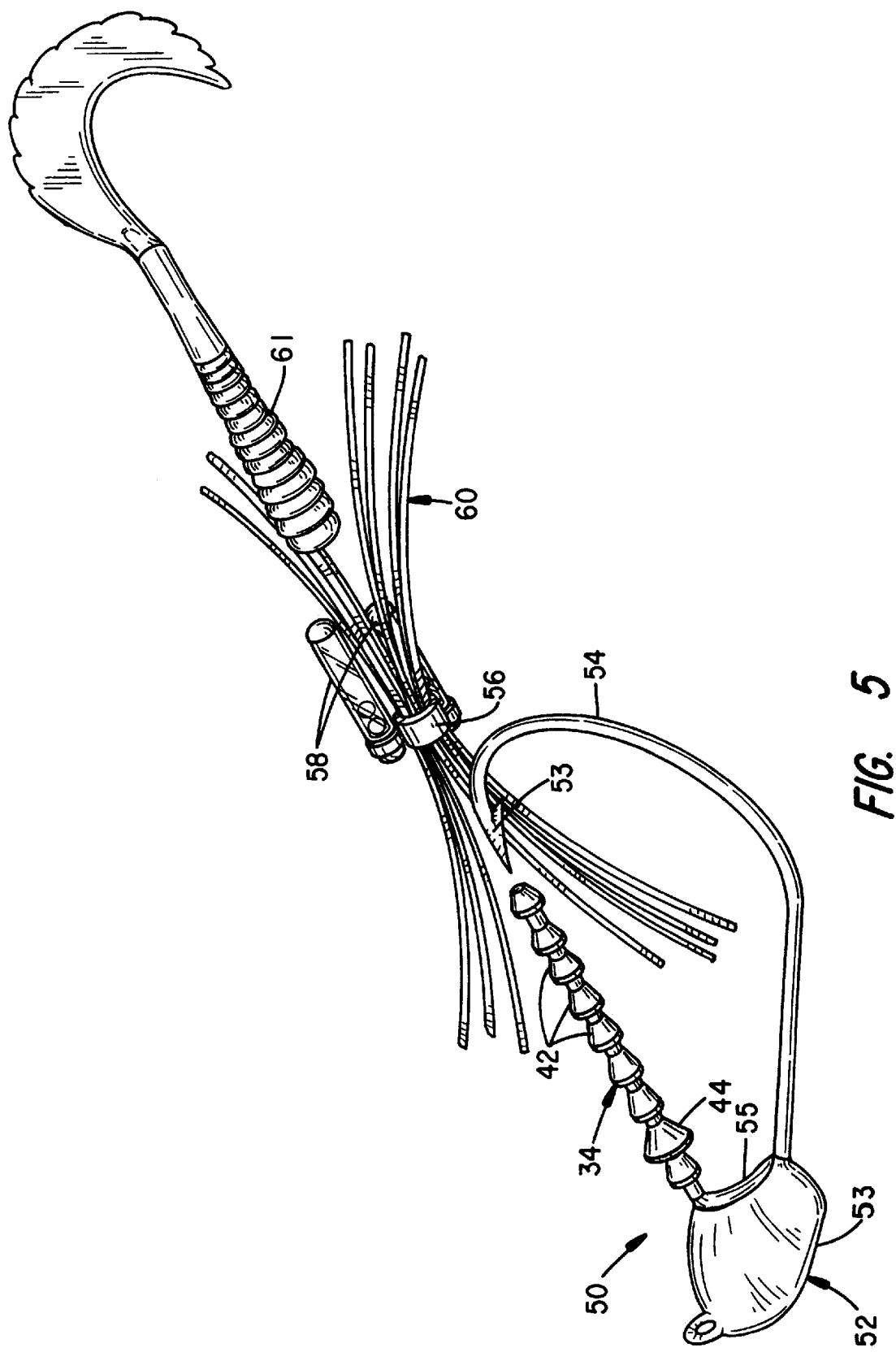
FIG. 5 is a perspective view shown in exploded assembly to a weedless jig that includes accessory rattles, a stranded skirt, the keeper and a plastisol body mounted thereto.

With attention to FIG. 5, the keeper 34 is cast into a jig head 52 and projects to align with a barb 53 of a hook 54. The head 52 can be molded from a heavy material, such as lead, or a lightweight, buoyant material, such as foam. The core 36 provides a degree of resilience to the keeper 34 comparable to bristle or wire weed guards. A band 56 supports a pair of rattles 58 and a multi-stranded skirt 60 to the keeper 34 next to the head 52 and forward of the enlarged protrusion 44. A trailer or dressing 61 is separately threaded onto the keeper 34 and held in place at the protrusions 42, aft of the protrusion 44. The hook barb 53 can again be mounted to the dressing 61 as desired.

Figure 6:
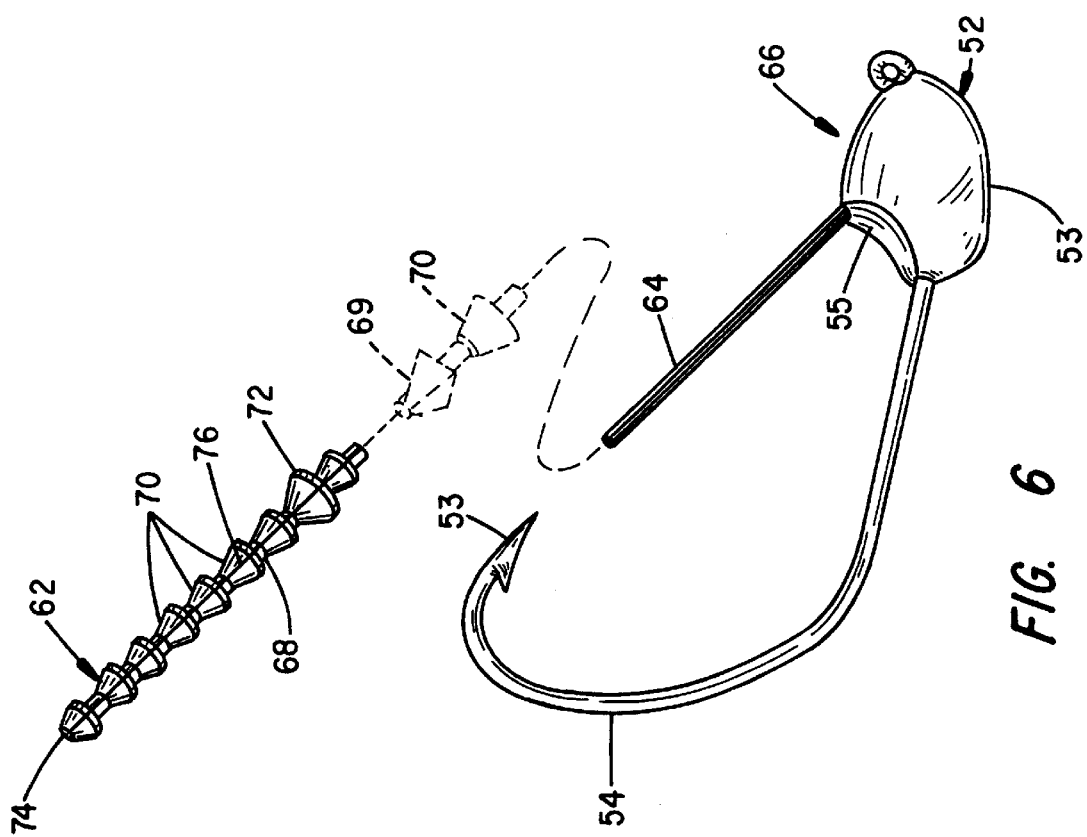
FIG. 6 is a perspective view shown in exploded assembly to the jig head of FIG. 5 that includes an integral weed guard and over a hollow and/or slit keeper can be fitted.

FIG. 6 shows an alternative keeper 62 that can be attached to a conventional wire or bristle weed guard 64 of a jig lure 66 having a head 52 of an identical shape to the lure 50. The keeper 62 is molded with a hollow stem 68 and from which small and large diameter protrusions 70 and 72 radiate. A hollow bore 74 extends through the stem 68 and the bore diameter is sized to mount over the weed guard 64.

A longitudinal slit 76 is formed into the keeper 62 to facilitate mounting and retention to the guard 64. The slit 76 allows the keeper 64 to expand and compress around the guard 64.

The keeper 62 can be molded from a material that shrinks upon exposure to heat. In this instance and once mounted to a desired portion of the lure 66 (e.g. the guard 64, the shank of the hook 54 or wire form (not shown)) heat can be appropriately applied to shrink and secure the keeper 62 in place.

Also shown in dashed line at FIG. 6 is an exemplary, pyramidal protrusion 69 and an elliptical protrusion 70 that can be formed at the keepers 2, 34 or 62.

Figure 7:
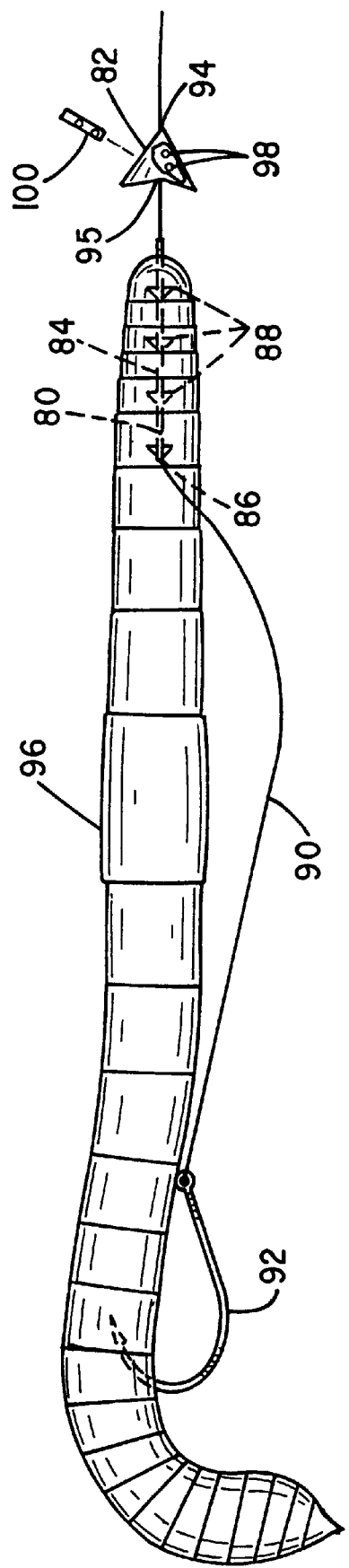
FIG. 7 is a plan view shown in exploded assembly to a worm harness assembly that includes the keeper and an interconnecting headpiece.

FIG. 7 shows another construction of a molded keeper 80 that is arranged in a harness assembly with a headpiece 82. A stem 84 provides a hollow bore 86 and a number of protrusions 88 radiate from the stem 84. A length of fish line or snell 90 that contains a hook 92 is threaded through the bore 86 and a bore 94 of the headpiece 82. With the initial insertion of the keeper 80 into an artificial dressing or live bait 96 and temporary exposure of the bore 94 through the side of the dressing 96, the line 90 can be threaded through the keeper 80. The hook 92 is set into the dressing 96 and the headpiece 82 is threaded over the exposed end of the line 90.

An exposed end of the keeper 80 can be shaped to interlock or nest within a cavity at the headpiece 82 or not as desired (e.g. a ball and socket mount or a mating concentric bore 95 sized to the outside diameter of the stem 84). A peg (not shown) can also be mounted into the bore 94 as a wedge to hold and displace the headpiece 82 some distance away from the dressing 96 in the fashion of a "Carolina rig". The headpiece 82 can be constructed of a weighted material, such as lead, or a floating material, such as foam or rubber. The headpiece 82 can also be made hollow to contain rattle beads 98. A rattle chamber 100 can also be fitted to the headpiece 82.

Although the invention is described with respect to a number of presently preferred keeper configurations and lure assemblies, still other configurations, modifications and improvements thereto may be suggested to those skilled in the art. It is also to be appreciated the described singular features can be used alone or combined in differing arrangements from those depicted. The following claims should therefore be interpreted broadly to include all equivalent constructions within the scope of the wording.

What is claimed is:

1. A keeper and a fishing lure in combination, wherein said keeper comprises:

a) a core member; and b) a tubular plastic stem having a longitudinal bore, wherein a plurality of projections extend along an outer surface of said stem, wherein each of said plurality of projections is defined by a surface rotated about said stem relative to said bore, and wherein said core member is mounted in said bore, secured to project from a body of said fishing lure, and separate from a hook also projecting from said body, whereby a dressing or live bait can be threaded onto said plurality of projections.

2. A keeper in combination with a fishing lure having a hook projecting from a head, said keeper comprising a core member and a substantially coextensive tubular plastic stem having a bore and mounted to said core member at said bore, wherein said core member is molded into said head, and wherein a plurality of projections radiate from an outer surface of said stem in concentric relation to said bore, wherein each of said plurality of projections is defined by a surface rotated about said stem relative to said bore, whereby a dressing or live bait can be threaded onto said keeper and secured to said lure.

3. A fishing lure comprising:

a) a head, a hook mounted to said head and having an eye, a shank and a barb, and a filamentary member and wherein said eye is exposed from said head and said shank extends through said head and said filamentary member projects from said head; and b) a keeper comprising a tubular plastic stem having a longitudinal bore, wherein a plurality of projections transversely radiate around an outer surface of said stem in concentric relation to said bore, and wherein said bore is mounted to said filamentary member, whereby a dressing or live bait can be threaded onto said keeper.

4. A fishing lure as set forth in claim 3 wherein said filamentary member comprises a wire.

5. A fishing lure as set forth in claim 3 wherein an outermost surface of at least one of said of said projections is displaced from the outer surface of said stem a distance greater than the other projections.

6. A fishing lure as set forth in claim 3 wherein each of said plurality of projections exhibits a frustum shape.

7. A fishing lure as set forth in claim 3 wherein a longitudinal slit coextensive with said stem communicates with said bore.

8. A fishing lure as set forth in claim 3 wherein said keeper is molded from a material that shrinks upon exposure to heat.

9. A fishing lure comprising:

a) a head and a hook mounted to project from said head and having an eye, a shank and a barb and wherein said eye is exposed from said head and said shank extends from said head; and b) a keeper comprising a core member and a substantially coextensive plastic stem mounted to said core member, wherein said core member is mounted to extend from said head, wherein a plurality of seriatim, frustum shaped projections radiate around a longitudinal outer surface of said stem in concentric relation to said stem and core, and wherein an apex of each projection is directed toward an end of said stem distal to said head, whereby a dressing or live bait can be threaded onto said keeper.

10. A fishing lure as set forth in claim 9 wherein one of said plurality of frustum shaped projections exhibits a radius greater than any other of said plurality of frustum projections.

11. A fishing lure as set forth in claim 9 wherein said core member comprises a wire.

12. A fishing lure as set forth in claim 9 wherein said core member comprises a plurality of filamentary members that extend from said head and said bore is mounted over said plurality of filamentary members.

13. A keeper in combination with a fishing lure, comprising:

a) said fishing lure having a head and a filamentary member mounted to extend from said head; and b) a tubular plastic stem having a longitudinal bore and a slit through an outer surface of said stem that communicates with and is coextensive with said bore, wherein a plurality of projections extend along said outer surface of said stem, wherein each of said plurality of projections is defined by a surface rotated about said stem relative to said bore, and wherein said filamentary member is mounted in said bore, whereby a dressing or live bait can be threaded onto said plurality of projections.

14. A keeper in combination with a fishing lure, comprising:

a) said fishing lure having a head and a wire molded to extend from said head; and b) a tubular plastic stem having a longitudinal bore and a slit through an outer surface of said stem that communicates with and is coextensive with said bore, wherein a plurality of projections extend along said outer surface of said stem, wherein each of said plurality of projections is defined by a surface rotated about said stem relative to said bore, and wherein said wire is mounted in said bore, whereby a dressing or live bait can be threaded onto said plurality of projections.

15. A fishing lure comprising:

a) a head, a hook and a filamentary member and wherein said hook and said filamentary member each extend from said head; and b) a keeper comprising a tubular plastic stem having a longitudinal bore and a coextensive longitudinal slit through an outer surface of said stem that communicates with and is coextensive with said longitudinal bore, wherein a plurality of projections transversely radiate relative to said bore from said outer surface of said stem, and wherein said bore is mounted over said filamentary member, whereby a dressing or live bait can be threaded onto said plurality of projections.

* * * * *